United States Patent
Zeng et al.

(10) Patent No.: US 11,009,012 B2
(45) Date of Patent: May 18, 2021

(54) COMBINED ENERGY SUPPLY SYSTEM OF WIND, PHOTOVOLTAIC, SOLAR THERMAL POWER AND MEDIUM-BASED HEAT STORAGE

(71) Applicant: SHENZHEN ENESOON SCIENCE & TECHNOLOGY CO., LTD., Guangdong (CN)

(72) Inventors: Zhiyong Zeng, Guangdong (CN); Xiaomin Cui, Guangdong (CN); Bei Huang, Guangdong (CN)

(73) Assignee: SHENZHEN ENESOON SCIENCE & TECHNOLOGY CO., LTD, Guangdong (CN)

( * ) Notice: Subject to any disclaimer, the term of this patent is extended or adjusted under 35 U.S.C. 154(b) by 76 days.

(21) Appl. No.: 15/540,332

(22) PCT Filed: Dec. 31, 2014

(86) PCT No.: PCT/CN2014/096000
§ 371 (c)(1),
(2) Date: Jun. 28, 2017

(87) PCT Pub. No.: WO2016/106726
PCT Pub. Date: Jul. 7, 2016

(65) Prior Publication Data
US 2017/0370250 A1 Dec. 28, 2017

(51) Int. Cl.
*F03G 6/06* (2006.01)
*F03D 9/00* (2016.01)
(Continued)

(52) U.S. Cl.
CPC ............. *F03G 6/067* (2013.01); *F03D 9/007* (2013.01); *F03D 9/18* (2016.05); *F03G 6/001* (2013.01);
(Continued)

(58) Field of Classification Search
CPC .......... F03G 6/065; F03G 6/067; F03G 6/001; Y02E 10/46; Y02E 10/50; Y02E 10/566;
(Continued)

(56) References Cited

U.S. PATENT DOCUMENTS 4,192,630 A * 3/1980 Duthweiler ........... E02B 17/028
405/195.1
2010/0175689 A1 * 7/2010 Zillmer ..................... F16L 9/18
126/90 R (Continued)

FOREIGN PATENT DOCUMENTS

CN 102562504 A 7/2012
CN 103277272 A * 9/2013
(Continued)

OTHER PUBLICATIONS

International Search Report and Written Opinion for Application No. PCT/CN2014/096000, dated Aug. 28, 2015.

*Primary Examiner* — Mark A Laurenzi
*Assistant Examiner* — Xiaoting Hu
(74) *Attorney, Agent, or Firm* — Marshall, Gerstein & Borun LLP

(57) ABSTRACT

Disclosed is a combined energy supply system of wind, photovoltaic, solar thermal power and medium-based heat storage, capable of storing the energy which would have been "abandoned wind" and "abandoned light" temporarily in the form of heat by medium-based energy storage. Heat is released during peaks in the power grid to generate power, which serves the function of adjusting the peaks in the power grid. With the medium-based energy storage, unstable photovoltaic electric energy can be converted into stable heat energy output when a relatively large fluctuation occurs in wind and photovoltaic power generation, and therefore the stable supply of energy sources can be guaranteed efficiently. Furthermore, a second heater can also be used for (Continued)

heating the low-temperature media outputted by a first medium tank (100), or a third heater is used for heating water in a heat exchanger (500), and therefore the energy storage of the medium or the heating efficiency of the heat exchanger is improved.

14 Claims, 9 Drawing Sheets

(51) Int. Cl.
*H02S 10/12* (2014.01)
*F03D 9/18* (2016.01)
*H02S 10/20* (2014.01)
*F03G 6/00* (2006.01)
*H02S 10/10* (2014.01)

(52) U.S. Cl.
CPC .............. *F03G 6/065* (2013.01); *H02S 10/10* (2014.12); *H02S 10/12* (2014.12); *H02S 10/20* (2014.12); *Y02E 10/46* (2013.01); *Y02E 10/50* (2013.01); *Y02E 10/70* (2013.01); *Y02E 10/72* (2013.01)

(58) Field of Classification Search
CPC ....... Y02E 10/70; Y02E 10/766; Y02E 20/14; Y02E 10/52; F03D 9/18; F03D 9/007; H02S 10/10; H02S 10/12; H02S 10/20
See application file for complete search history.

(56) References Cited

U.S. PATENT DOCUMENTS

| | | | |
|---|---|---|---|
| 2013/0081394 A1* | 4/2013 | Perry | F03G 6/005 60/641.8 |
| 2014/0033707 A1* | 2/2014 | Rodionov | F03D 9/17 60/641.8 |
| 2014/0352304 A1* | 12/2014 | Arias | F03G 6/067 60/641.15 |
| 2015/0167647 A1* | 6/2015 | Gulen | F03G 6/06 60/641.11 |

FOREIGN PATENT DOCUMENTS

| | | | |
|---|---|---|---|
| CN | 103742373 A | | 4/2014 |
| CN | 103868389 A | | 6/2014 |
| CN | 203925623 U | * | 11/2014 |
| CN | 204458210 U | | 7/2015 |
| DE | 10 2012 024526 B4 | | 9/2014 |
| GB | 2 013 789 A | | 8/1979 |
| WO | WO-2014086295 A1 | * | 6/2014 ............ F24D 11/003 |

* cited by examiner photovoltaic power output during a sunny weather photovoltaic power output during a cloudy weather photovoltaic power output during a rainy weather

COMBINED ENERGY SUPPLY SYSTEM OF WIND, PHOTOVOLTAIC, SOLAR THERMAL POWER AND MEDIUM-BASED HEAT STORAGE

FIELD OF THE INVENTION

The present application relates to the field of power generation, especially to a combined energy supply system of wind, photovoltaic, solar thermal power and medium-based heat storage.

BACKGROUND OF THE INVENTION

Wind and photovoltaic centric new energy has been achieving significant development in recent years, however, in the process of new energy construction, the resources is mainly valued while the market is overlooked, which may result in excess scale and make the generated power hard to be delivered, thereby raising issues of "abandoned wind" and "abandoned light". "Abandoned light" refers to giving up the power generated by the photovoltaic, which normally means that power grid access of a photovoltaic system is not allowed because the electric power of the energy generated by the photovoltaic system changes constantly due to the effect of environmental factors and is not a stable power supply, and thus the power grid management unit rejects the photovoltaic system to be connected to the grid for this reason. "Abandoned wind" refers to the condition when some draught fans in a wind power plant are suspended for features such as insufficient admitting ability of a local power grid, schedule mismatch for wind power plant construction and unstable wind in an initial development stage and when the draught fans are in a normal condition. The "abandoned wind" and "abandoned light" result in significant energy waste and economic loss.

Furthermore, because of a volatility of wind and photovoltaic power generation, the power generated by wind or photovoltaic power generation is not always stable, which may impact the power grid seriously if a wind or photovoltaic system is connected grid directly.

SUMMARY OF THE INVENTION

Based on above reasons, it is necessary to provide a combined energy supply system of wind, photovoltaic, solar thermal power and medium-based heat storage that can utilize energy sources of "abandoned wind" and "abandoned light" efficiently and reduce an impact on the power grid after grid connection.

A combined energy supply system of wind, photovoltaic, solar thermal power and medium-based heat storage, which includes:

a first medium tank configured to store unheated medium;

a second medium tank configured to store heated medium;

a photovoltaic and wind power generation equipment configured for wind and photovoltaic power generation;

a first heater configured to heat the unheated medium in the first medium tank into the heated medium using power generated by the wind and photovoltaic power generation equipment;

a heat exchanger configured to heat water to steam using the heated medium outputted by the second medium tank;

a steam generator set configured to make the steam drive a steam turbine to generate power;

wherein the unheated medium is output from the first medium tank, and heated by the first heater to be converted into the heated medium which is stored in the second medium tank; the heated medium is then output from the second medium tank into the heat exchanger, and the steam generated by the heat exchanger drives the steam generator set to generate power;

and further includes: a second heater configured to heat the unheated medium output by the first medium tank or a third heater configured to heat the water or steam in the heat exchanger.

In one embodiment, the second heater includes a first tower solar heat collector equipment or trough solar heat collector equipment.

In one embodiment, the third heater includes a second tower solar heat collector equipment or a second trough solar heat collector equipment.

In one embodiment, a heating equipment or a refrigeration equipment is further included; the heating equipment or the refrigeration equipment is connected to the heat exchanger.

In one embodiment, the heat exchanger includes a superheated steam generator that generates superheated steam, a steam generator that generates saturated steam and a preheater that heats the water; the heated medium outputted by the second medium tank heats the superheated steam generator, the steam generator and the preheater in sequence; the superheated steam generator is connected to the steam generator set, and the superheated steam generated by the superheated steam generator drives the steam turbine to generate power.

In one embodiment, the third heater heats the superheated steam generator to generate the superheated steam which drives the steam turbine to generate power.

In one embodiment, a water treatment equipment connected to the steam generator set and the heat exchanger is further included; the water treatment equipment treats the water liquefied by the steam after passing through the steam generator set; the treatment includes at least one of nitrogen-removal, desalting and cooling treatment, and the treated water is delivered back into the heat exchanger.

In one embodiment, a first medium pump configured to provide mobilization dynamic for the unheated medium and a second medium pump configured to provide mobilization dynamic for the heated medium are further included.

In one embodiment, at least one of a temperature sensor, a flow sensor, a pressure sensor and a speed sensor is/are further arranged among the equipment according to requirements.

The combined energy supply system of wind, photovoltaic, solar thermal power and medium-based heat storage is capable of storing the energy which would have been "abandoned wind" and "abandoned light" temporarily in the form of heat by medium-based energy storage. By utilizing the medium to store the energy, the electrothermal efficiency can be more than 90%; the energy utilization ratio is high and the energy is stored properly. During a power grid peak, the heat can be released to generate power, which functions as peak shaving in power grid and avoids energy waste. Utilizing the medium to store energy may convert unstable wind and photovoltaic power into stable thermal energy and export when the wind and photovoltaic power generation generates a large fluctuation, which ensures stable supply of energy and reduces impact on the power grid. Utilizing the second heater to heat the unheated medium outputted by the first medium tank or utilizing the third heater to heat the water in the heat exchanger may improve stored energy of the medium or heating efficiency of the heat exchanger, thereby improving power generation.

In the aforesaid combined energy supply system of wind, photovoltaic, solar thermal power and medium-based heat storage, the wind and photovoltaic power generation equipment can not only utilize all the electric power generated by wind and photovoltaic to heat the medium for storing energy and then generate power, but also generate power and synchronously utilize the remaining power to heating the medium (unheated medium). When the remaining energy is not much while the demand is high (for example, during summer daytime, the power demand is so high that the remaining energy is not much or even insufficient), the power generated by the medium is then insufficient. Thus, the second heater may be utilized to heat the low-temperature medium outputted by the first medium tank, or the third heater may be utilized to heat the water in the heat exchanger so as to improve stored energy of the medium or heating efficiency of the heat exchanger, thereby improving power generation. Therefore, the steam generator set may generate power instantly or release heat to generate power until power grid peaks, such that the peak shaving in power grid is further improved. Surely, the second heater or the third heater can work during any daytime having sunlight and does not need to wait until the remaining energy is insufficient while the demand is high and then work, thus the energy can be stored for energy-shortage areas so as to supply power in real time.

DETAILED DESCRIPTION OF THE PREFERRED EMBODIMENT

For better understanding the present application, the present application will be further described more comprehensively hereinafter with reference to accompanying drawings. The drawings provide preferred embodiments of the present application. However, the present application can be realized in many different ways, and should not be limited to the embodiments as described in the document. Conversely, the purpose to provide the embodiment is to make the disclosure of the present application more thorough and accomplished.

Unless otherwise defined, all the technical and scientific terminologies used in the present application possess identical meanings as that understood by those skilled in the art. The terminologies used in the specification of the present application are merely for describing the specific embodiments but not for limiting the present application. The terminology "and/or" used in the document includes combinations of one or more of all the items or all the items.

Figure 1:
FIG. 1 is a time-current graph of photovoltaic power generation.

Photovoltaic-generated power is direct current which cannot be directly grid connection, as shown in FIG. 1.

Figure 2:
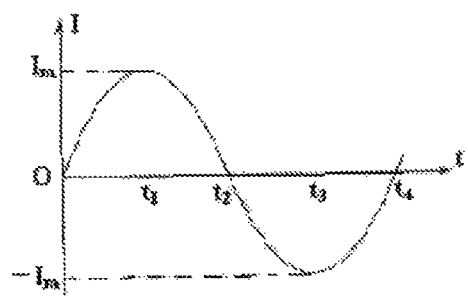
FIG. 2 is a time-current graph of coal power generation.

In developing countries, coal power generation is still a main power generation method. Power generated by the coal power generation is mainly alternating current, as shown in FIG. 2.

Figure 3:
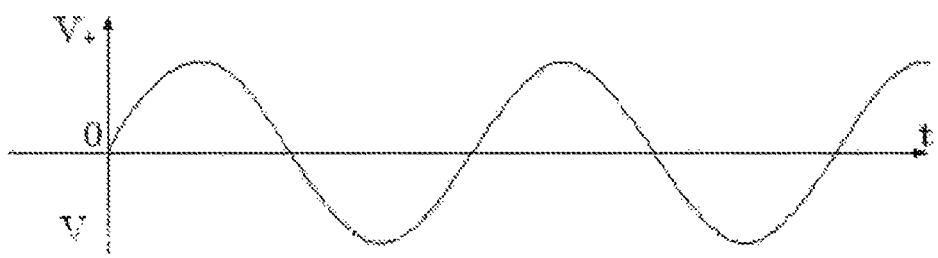
FIG. 3 is a time-voltage graph of solar thermal power generation.

Compared with the coal power generation, solar thermal power generation merely replaces the pollution section of coal-fired boil; the power generated by the solar thermal power generation is identical with that generated by the coal power generation, and the frequency, hertz match with the power generated by the coal power generation, and can be grid connection directly, as shown in FIG. 3.

If the photovoltaic requires to be combined to the grid, then the photovoltaic need to be converted into alternative current by an inverter which may cause power grid interference including harmonic. The power grid interference means all situations that may change ideal sinusoids of voltage and circuit on amplitude and frequency. Power grid harmonic causes power grid pollution and wave distortion of sinusoidal voltage, which makes the equipment of the power system generate abnormal and faulted.

The following situations can be all called as "power grid interference":
(1) harmonic; (2) interharmonic oscillation; (3) voltage change; (4) voltage unbalance of three-phase power grid; (5) pulse frequency fluctuation. The power grid interference may influence loads and power transmission grid in many ways, such as: (1) influence to electronic components and controllers; (2) increase of loads may result in increase of temperature of electronic components (such as cable and transformer); (3) influence to power factor; (4) increase to power transmission loss.

Figure 4:
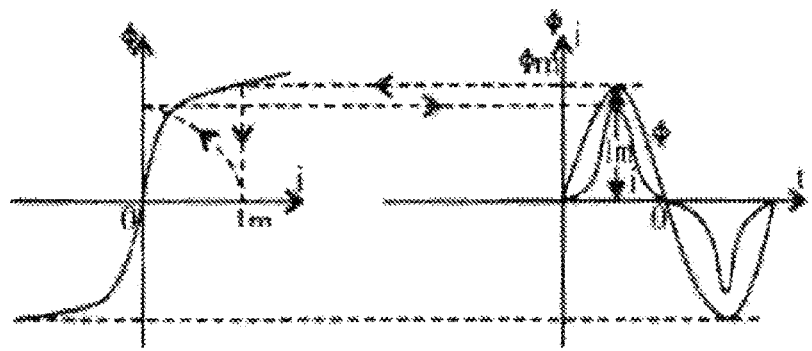
FIG. 4 is a magnetization curve graph of a transformer.

FIG. 4 is a magnetization curve graph of a transformer, which discloses the principle causing transformer harmonic.

The harms of harmonic in power system are various, and mainly include:
(1) detriment to power supply and distribution line; under the effect of the harmonic, electromechanical protection is prone to be mal-operated, which cannot have protective effect comprehensively and efficiently.
(2) influence to quality of the power grid; the harmonic may cause series resonance, parallel resonance, harmonic enlargement and cause dangerous overvoltage and overcurrent.
(3) increase to electrical transmission line loss, and decrease to service time of the electrical transmission line; on one hand, harmonic current causes voltage drop in the electrical transmission line, on the other hand, increases current virtual value in the electrical transmission line, thereby causing additional electrical transmission loss.

(4) influence to capacitor; since the harmonic is capable of increasing current, capacitor loss is increased, thereby causing heating and temperature rise of the capacitor, and accelerating ageing.

(5) influence to the motor, the harmonic increases additional loss, and in severe case, the motor will be overheated, especially, negative-sequence harmonics will cause reversed torque when the motor is working, thereby reducing the motor output.

Solar photovoltaic power generated energy is featured in discontinuous and unstable.

Figure 5:
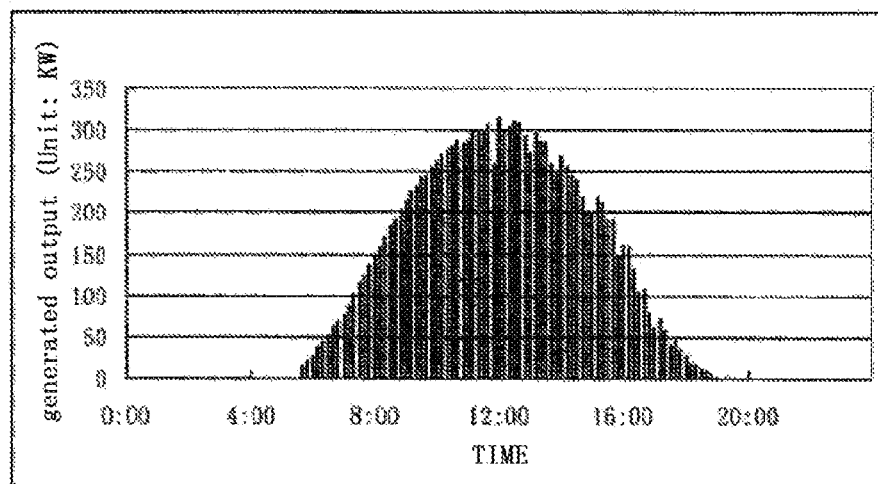
FIG. 5 is a power graph of photovoltaic power generation during a sunny time.

Under different weather types during daytime, the generated power of the photovoltaic system varies greatly. To take statistics of a solar photovoltaic power plant for example:

FIG. 5 is a power graph of photovoltaic power generation during sunny time. Power of photovoltaic power generation changes continuously and evenly with time, and presents an approximately normal distribution. Effective power generation time zone is from 6 am to 6 pm. The highest power for the day is about 302 KW, which occurs at about 12 am.

Figure 6:
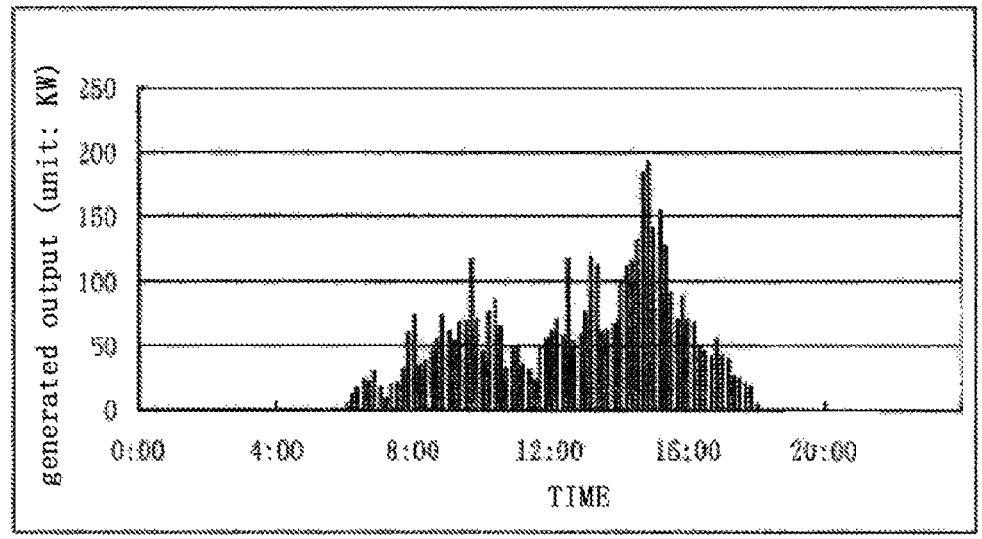
FIG. 6 is a power graph of photovoltaic power generation during a cloudy time.

FIG. 6 is a power graph of photovoltaic power generation during cloudy time. The effective power generation time zone is basically invariant, which is still from 6 am to 6 pm, however, the photovoltaic output power in the meanwhile is no longer stable. Under the effect of block of cloud, the output power varies a lot. Mostly, power of the power generation all through a day is less than 100 KW; the highest power for the day is merely 190 KW, which occurs at about 3 pm.

Figure 7:
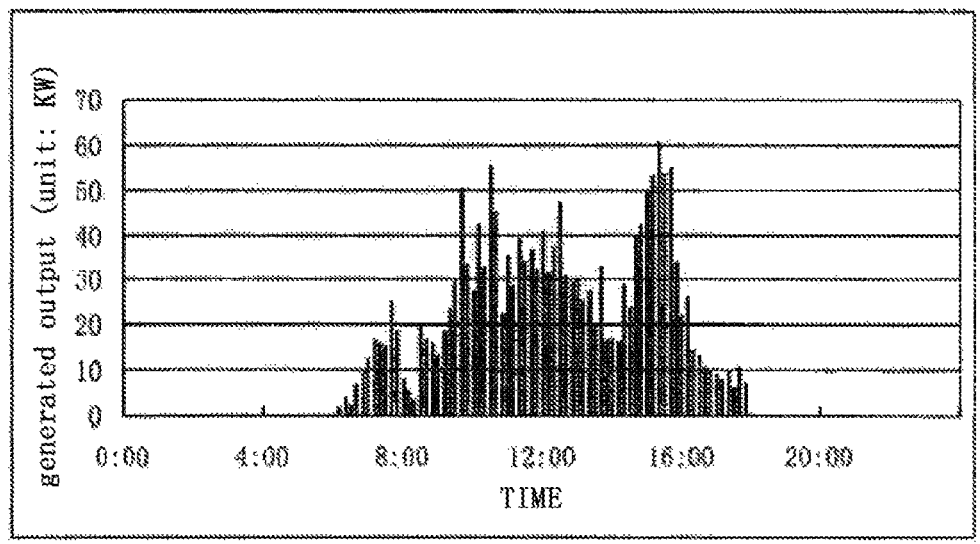
FIG. 7 is a power graph of photovoltaic power generation during a rainy time.

FIG. 7 is a power graph of photovoltaic power generation during rainy time, which still presents a great random fluctuation. However, because sunlight is more insufficient for overcast weather, the power of system power generation is basically below 40 KW, and can mealy reach ⅕ of the power generated during sunny time; the highest power for the day is merely 60 KW, which occurs at about 3 pm.

Figure 8:
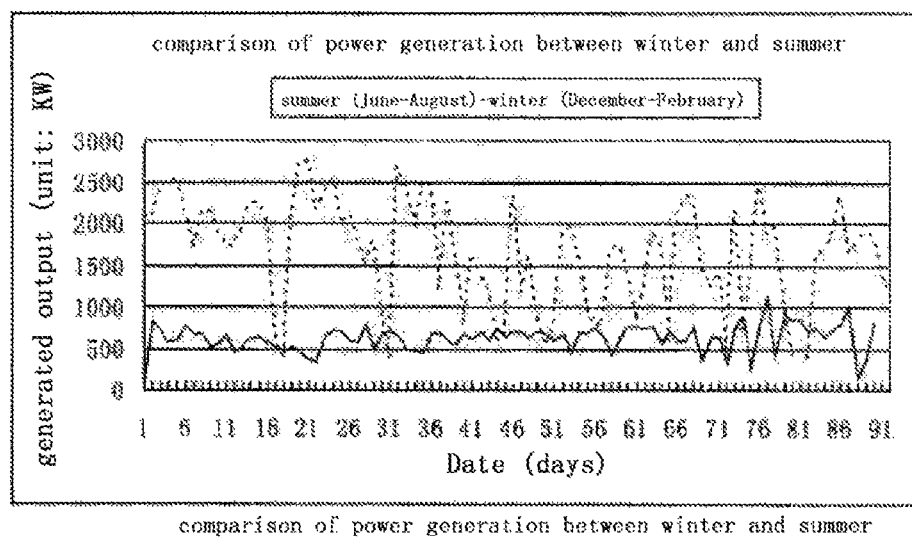
FIG. 8 is a comparison graph of power generation between winter and summer.

FIG. 8 is a comparison graph of power generation between winter and summer, which shows that the power generated by photovoltaic system varies a lot among different seasons.

Therefore, if the photovoltaic power generation, solar thermal power generation and energy storage are combined together, alternative current (such as coal power supply) matched with the original power grid can be generated, and the power grid interference problem existed in photovoltaic grid connection can also be overcome, furthermore, the energy generated by the unstable and discontinuous photovoltaic generation can be stored properly, which avoids energy loss.

Figure 9:
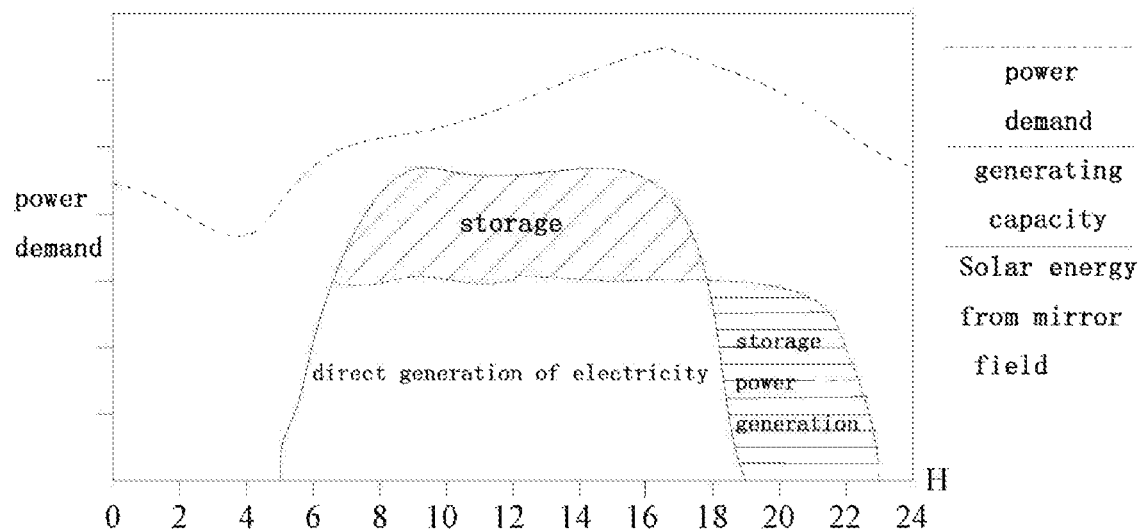
FIG. 9 is a wave curve graph of power demand through a day.

FIG. 9 is a wave curve graph of power demand through a day. The scattered dash line shows that the electric power demand varies with time, the volatility requires that the power generation method should possess peak shaving capacity, such that the generating capacity matches with power demand. The dense dash line in the figure is a line indicating power generated by solar thermal power generation; the energy stored by the energy stored system can store the part filled with twill so as to supplement the energy demand filled by the band, fulfill the electric power demand for power peaks, which functions as energy storage and peak shaving.

Figure 10:
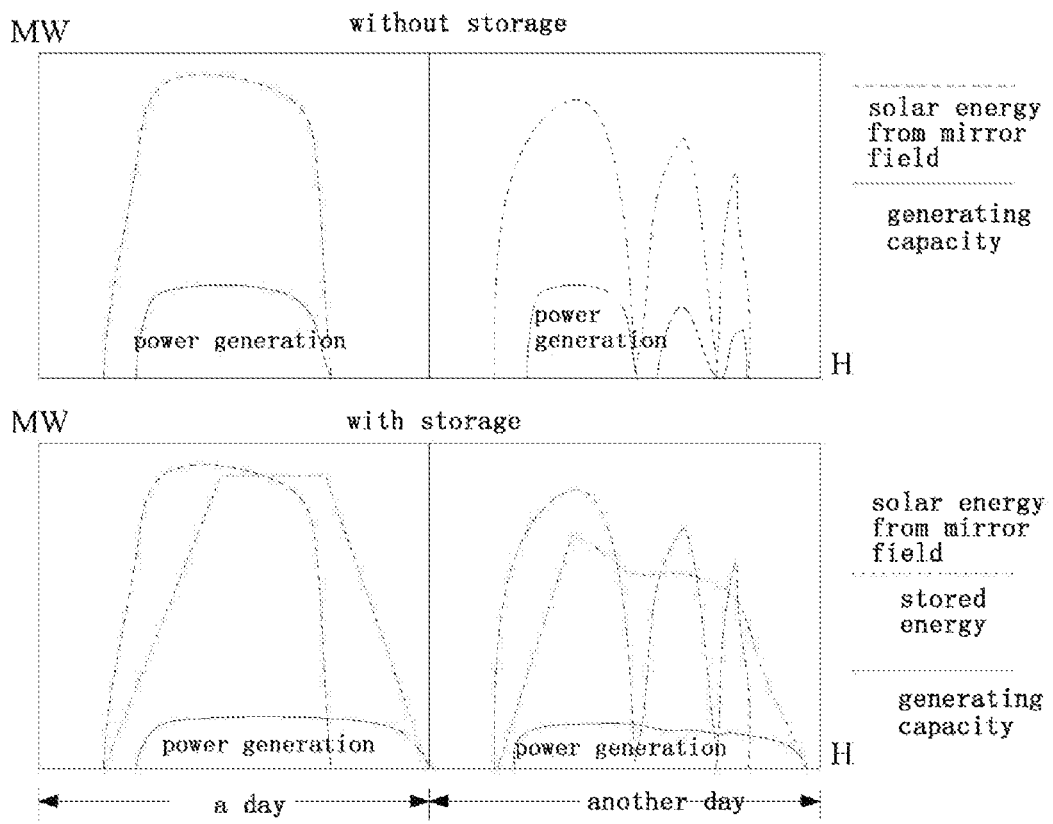
FIG. 10 is a comparison graph of solar thermal power generation systems equipped with energy storage and without energy storage.

FIG. 10 is a comparison graph of solar thermal power generation system equipped with energy storage and without energy storage. The installed energy of the solar thermal power generation system equipped with energy storage is 50 MW; the installed energy of the solar thermal power generation system without energy storage is 100 MW. The scattered dash line indicates solar energy from a mirror field; the dense dash line indicates the stored energy of the power generation system; the solid line indicates generating capacity of the power generation system. As shown in the figure, under the same mirror field condition, the solar thermal power generation system equipped with energy storage of 50 MW is capable of delivering identical electric energy to the solar thermal power generation system with the installed energy of 100 MW without energy storage. The power generation system equipped with energy storage is more stable in power generation, and possesses longer power generation duration, which avoids energy waste.

Figure 11:
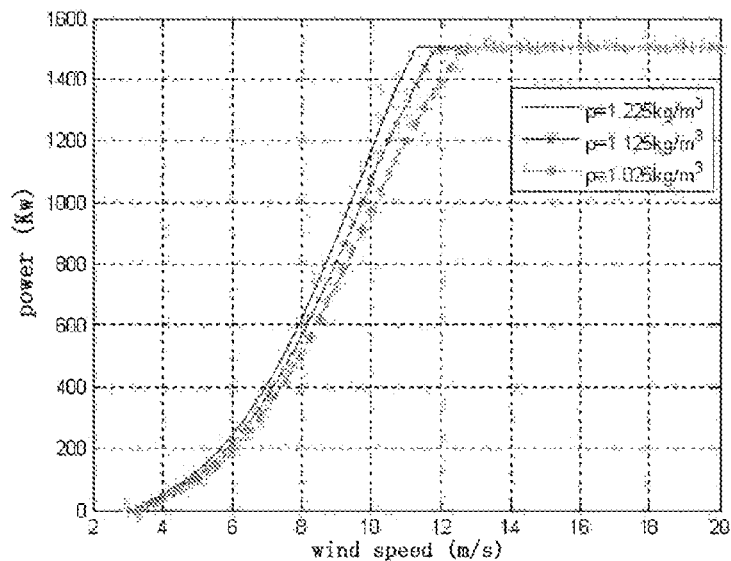
FIG. 11 is a power curve graph of a photovoltaic generator set under different air densities.

FIG. 11 is a power curve graph of a photovoltaic generator set under different air densities.

Wind power generation is influenced by factors such as wind speed and air density, therefore, the output power is unstable. Grid connection of wind power generation can be classified into three modes: soft grid connection, reduced voltage operation and rectifier and inverter. Grid connection control can influence whether the wind electric generator can deliver electric power to power transmission network and whether the generator set is influenced by the surge current during grid connection process. Rectifier and inverter is a good grid connection method, the generated electric power is rectified by a charger and charged by an accumulator jar, and the electric power generated by the wind electric generator is converted into chemical energy. Then an inverter power supply with a protective circuit converts the chemical power in the accumulator jar into alternative 220V electric supply so as to ensure use stability.

Except for the seasonal variation, wind power varies greatly every day. Therefore, an actual power grid load in a day may be not matched with the load generated by the wind power. Normally, the maximum load in a day for a normal power grid occurs twice, i.e., 9 am and 7 pm; the load at daytime is about 90%-100%, and the load at night is about 60%.

However, the load of wind power varies in a relative larger range within one day, which normally has three peaks, the wind speeds up gradually at night, and reaches peaks in the morning, however, the actual load of power grid is relatively low, which can not totally consume the electric power generated by the wind power. The second peak happens at 10 am, and the third peak happens at 5 pm. This would result that when the power grid is at peak, the wind power is at low ebb or when the winder power is at low ebb, then wind power keeps generating power.

The irregular load output of wind power aggravates regulation amplitude of power grid, and wind power generation cannot regulate the load for the power grid actively, therefore, when the wind power is increased and account for a certain percentage of the power grid, the stability and safety of the power grid will be influenced.

The solar photovoltaic power generation can output energy stably and has the functions of energy storage and peak shaving by equipping with the energy storage system. To address the above issues, a combined energy supply system of wind, photovoltaic, solar thermal power and medium-based heat storage is designed.

The present application discloses a combined energy supply system of wind, photovoltaic, solar thermal power and medium-based heat storage, which includes:
a first medium tank configured to store unheated medium;
a second medium tank configured to store heated medium;
a wind and photovoltaic power generation equipment configured for power generation;

a first heater configured to heat the unheated medium in the first medium tank into the heated medium using power generated by the wind and photovoltaic power generation equipment;

a heat exchanger configured to heat water to steam using the heated medium output by the second medium tank;

a steam generator set configured to make the steam drive a steam turbine to generate power;

wherein the unheated medium is output from the first medium tank, and heated by the first heater to be converted into the heated medium which is stored in the second medium tank; the heated medium is then output from the second medium tank into the heat exchanger and the steam generated by the heat exchanger drives the steam generator set to generate power;

and further includes: a second heater configured to heat the unheated medium outputted by the first medium tank or a third heater configured to heat the water or steam in the heat exchanger.

The temperature of the unheated medium is about 250° C.-300° C.; the temperature of the heated medium is about 550° C.-600° C.

The combined energy supply system of wind, photovoltaic, solar thermal power and medium-based heat storage is capable of storing the energy which would have been "abandoned wind" and "abandoned light" temporarily in the form of heat by medium-based energy storage. By utilizing the medium to store the energy, the electrothermal efficiency can be more than 90%; energy utilization ratio is high and the energy is saved properly. During power grid peak, the energy will release heat and generate power, which functions as peak shaving in power grid and avoids energy waste properly. Utilizing the medium to store energy may convert unstable wind and photovoltaic power into stable thermal energy and export when a considerable fluctuation happens to the wind and photovoltaic power generation, which guarantees stable supply of energy and reduces impact on the power grid. Utilizing the second heater to heat the unheated medium outputted by the first medium tank or utilizing the third heater to heat the water in the heat exchanger may improve stored energy of the medium and heating efficiency of the heat exchanger, thereby improving power generation.

In the combined energy supply system of wind, photovoltaic, solar thermal power and medium-based heat storage, the wind and photovoltaic power generation equipment can not only utilize all the power generated by wind and photovoltaic to heat the medium, store energy and then generate power, but also generate power, at the same time, utilize the remaining power to heating the medium (unheated medium). When the remaining energy is not much while the demand is high (for example, during summer daytime, the power demand is so high that the remaining energy is not much or even insufficient), then the power generated by the medium is insufficient. Then, the second heater may be utilized to heat the low-temperature medium outputted by the first medium tank, or a third heater may be utilized to heat the water in the heat exchanger so as to improve stored energy of the medium and heating efficiency of the heat exchanger, thereby improving power generation. Therefore, the steam generator set may generate power instantly or release heat to generate power until power grid peaks, such that the peak shaving in power grid is further improved. Surely, when there is sunlight during daytime, the second heater or the third heat can work and does not have to wait until the remaining energy is insufficient while the demand is high, then the energy can be stored in energy-shortage areas so as to supply power in real time.

The medium can be any heat storage material, in the following description, the medium is molten salt.

Figure 12:
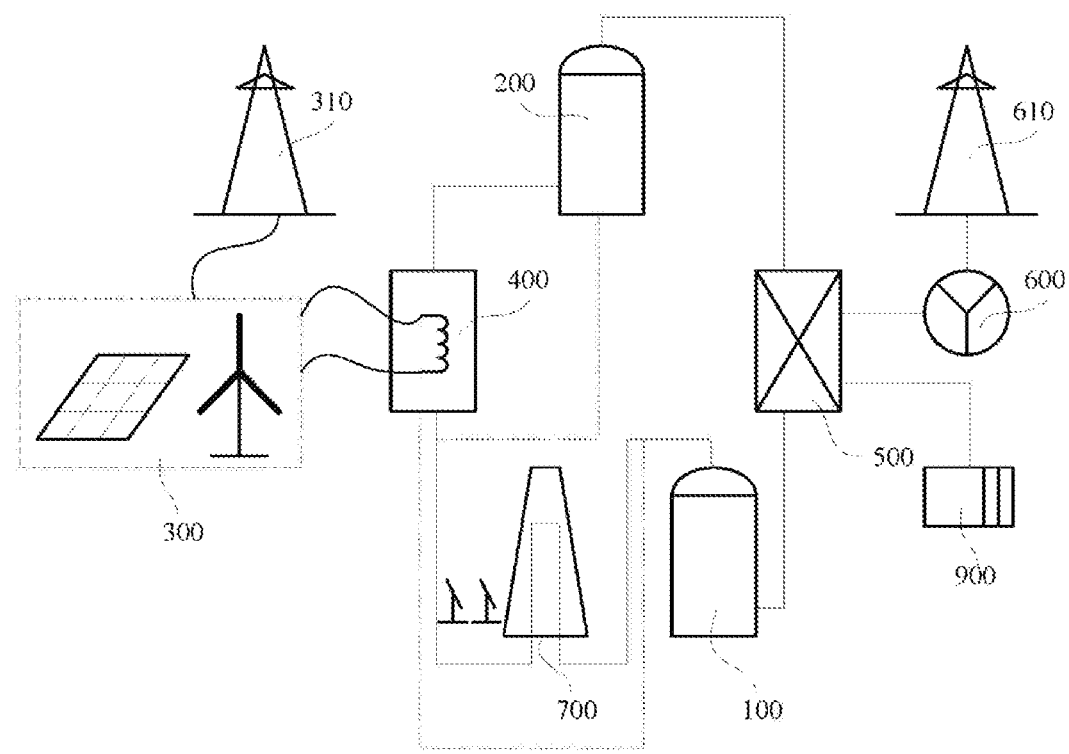
FIG. 12 is a schematic view of an energy supply system of wind, photovoltaic, solar thermal power and molten salt-based heat storage according to an embodiment.

FIG. 12 is a schematic view of an energy supply system of wind, photovoltaic, solar thermal power and molten salt-based heat storage according to an embodiment.

In the following description, the temperature of the unheated molten salt is about 250° C.-300° C.; the temperature of the heated molten salt is about 550° C.-600° C. In the following description, the first medium tank is a low-temperature molten salt tank configured to store the low-temperature molten salt; the second medium tank is a high-temperature molten salt tank configured to store the high-temperature molten salt; the first heater is a molten salt electric heater configured to heat the molten salt.

An energy supply system of wind, photovoltaic, solar thermal power and molten salt-based heat storage, which includes: a low-temperature molten salt tank 100 configured to store the low-temperature fused tank, a high-temperature molten salt tank 200 configured to store the high-temperature fused tank, a photovoltaic power generation equipment 300 configured to generate power, a molten salt electric heater 400 configured to heat the low-temperature molten salt outputted by the low-temperature molten salt tank 100 into the high-temperature molten salt using power generated by the wind and photovoltaic power generation equipment 300, a heat exchanger 500 configured to heat water to steam using the high-temperature molten salt outputted by the high-temperature molten salt tank, a steam generator set 600 configured to make steam drive a steam turbine to generate power, a first tower solar heat collector equipment 700 configured to heat the low-temperature molten salt outputted by the low-temperature molten salt tank 100 and a heat supply or refrigeration equipment 900, the heat supply equipment or the refrigeration equipment can exist simultaneously. The molten salt electric heater 400 can be an electric heating tape twined around the high-temperature molten salt tank 200, which is called usually as electric tracer heating tape; and can also be an individual heater as in the embodiment.

The low-temperature molten salt of about 250° C.-300° C. is outputted by the low-temperature molten salt tank 100, and heated by the molten salt electric heater 400 into the high-temperature molten salt of about 550° C.-600° C., and stored in the high-temperature molten salt tank 200. The high-temperature molten salt is outputted by the high-temperature molten salt tank 200 to the heat exchanger 500 which generates steam so as to drive the steam generator set 600 to generate power.

A first molten salt pump (not shown) configured to provide mobilization dynamic for the low-temperature molten salt in the low-temperature molten salt tank 100 is further connected between the low-temperature molten salt tank 100 and the molten salt electric heater 400; and a second molten salt pump (not shown) configured to provide mobilization dynamic for the high-temperature molten salt in the high-temperature molten salt tank 200 is further connected between the high-temperature molten salt tank 200 and the heat exchanger 500. The first molten salt pump is mounted on the top of the low-temperature molten salt pump 100; the second molten salt pump is mounted on the top of the high-temperature molten salt pump 200. Surely, the first molten salt pump and the second molten salt pump can both be molten salt submerged pump, which are located inside the molten salt tanks. A spare pump for the first molten salt pump and another spare pump for the second molten salt pump can be also provided so as to improve operational stability of the system. The molten salt can be carbonate or nitrate.

The wind and photovoltaic power generation equipment 300 can not only generate power for residents and plants through a power transmission device 310, but also provide electric power to the molten salt electric heater 400. When the power generation is unstable, the wind and photovoltaic power generation equipment 300 utilizes the unstable power to provide electric power to the molten salt heater 400 so as to use the energy wasted for "abandoned light" efficiently, and can also provide electric power to the molten salt electric heater 400 under any circumstance, which can store energy for an area where energy is in short supply so as to provide power in real time. By converting unstable wind and photovoltaic electric power into stable thermal energy and delivering again, stable supply for energy can be guaranteed efficiently, and an impact to the power grid after grid connection can be reduced.

The low-temperature molten salt is heated into the high-temperature molten salt through two channels, one of them is that the lower-temperature molten salt tank 100 is heated through the first tower solar heat collector equipment 700 into the high-temperature molten salt; the other one is heated through the molten salt electric heater 400 into the high-temperature molten salt which is then stored in the high-temperature molten salt tank 200. Through the first tower solar heat collector equipment 700 and the molten salt electric heater 400, the molten salt is heated into an appropriate temperature, which utilizes the energy of "abandoned light" efficiently, and saves the cost of a tower solar heat collector equipment with high construction cost.

Therefore, the heat source of the heat storage molten salt of the system comes from two aspects, one aspect is the first tower solar heat collector equipment 700; the other aspect is the wind and photovoltaic power generated molten salt electric heater 400. Parts of the power absorbed by the first tower solar heat collector equipment 700 in daytime can generate power, the remaining parts can be used to store energy. The quantity of the stored energy can be determined according to demand of power, heat and gas utilization at night. By utilizing wind and photovoltaic power generation equipment 300 to heat the molten salt, the "abandoned wind" energy can be utilized efficiently, and the cost of a tower solar heat collector equipment with high construction cost can be saved. The investment for heliostats will be reduced accordingly, and the "abandoned light" can be avoided.

Surely, a pipeline route (as indicated by dash line) directly connected between the low-temperature molten salt tank 100 and the molten salt electric heater 400 can also be added. When the energy supplied by the wind and photovoltaic power generated molten salt electric heater 400 is sufficient, the low-temperature molten salt can be delivered into the molten salt electric heater 400 to be heated directly.

In the same way, a pipeline route (as indicated by dash lines) directly connected between the first tower solar heat collector equipment 700 and the high-temperature molten salt tank 200 can also be added. When the energy supplied by the first tower solar heat collector equipment 700 is sufficient, the low-temperature molten salt can be heated merely through the first tower solar heat collector equipment 700 and inputted into the high-temperature molten salt tank 200.

The high-temperature molten salt is delivered to the heat exchanger 500; water in the heat exchanger 500 is heated by high temperature of the high-temperature molten salt. Specifically, the heat exchanger 500 includes a superheated steam generator that generates superheated steam, a steam generator that generates saturated steam and a preheater that heats the water (all not shown); the high-temperature molten salt outputted by the high-temperature molten salt tank 200 heats the superheated steam generator, the steam generator and the preheater in sequence; the superheated steam generator is connected to the steam generator set 600, and the superheated steam generated by the superheated steam generator drives the steam turbine to generate power, and supply power to residents and plants through a power transmission equipment 610. The heat supply or refrigeration equipment 900 is connected to the heat exchanger 500; the heat supply or refrigeration equipment 900 can also supply heating or cooling to residents or plants utilizing hot water in the heat exchanger 500. When the energy is sufficient, power, heating and cooling supply can be provided simultaneously.

In the embodiment, a water treatment equipment (not shown) connected to the steam generator set 600 and the heat exchanger 500 is further included; the water treatment equipment treats the water liquefied by the steam (super-saturated steam) after passing through the steam generator set 600; the treatment includes nitrogen-removal, desalting and cooling treatment, and the treated water is delivered back into the heat exchanger 500 for circulation, which is environmental protective and energy economical.

A temperature sensor, a flow sensor, a pressure sensor and a speed sensor can be further provided among the equipment according to requirements. For example, entrance and exit to the molten salt of the molten salt electric heater 400 are provided with temperature sensors; both the low-temperature molten salt tank 100 and the high-temperature molten salt tank 100 are provided with temperature sensors; both pipelines for transmitting the low-temperature molten salt and the high-temperature molten salt are provided with temperature sensors, pressure sensors and flow sensors, thereby monitoring the system.

Figure 13:
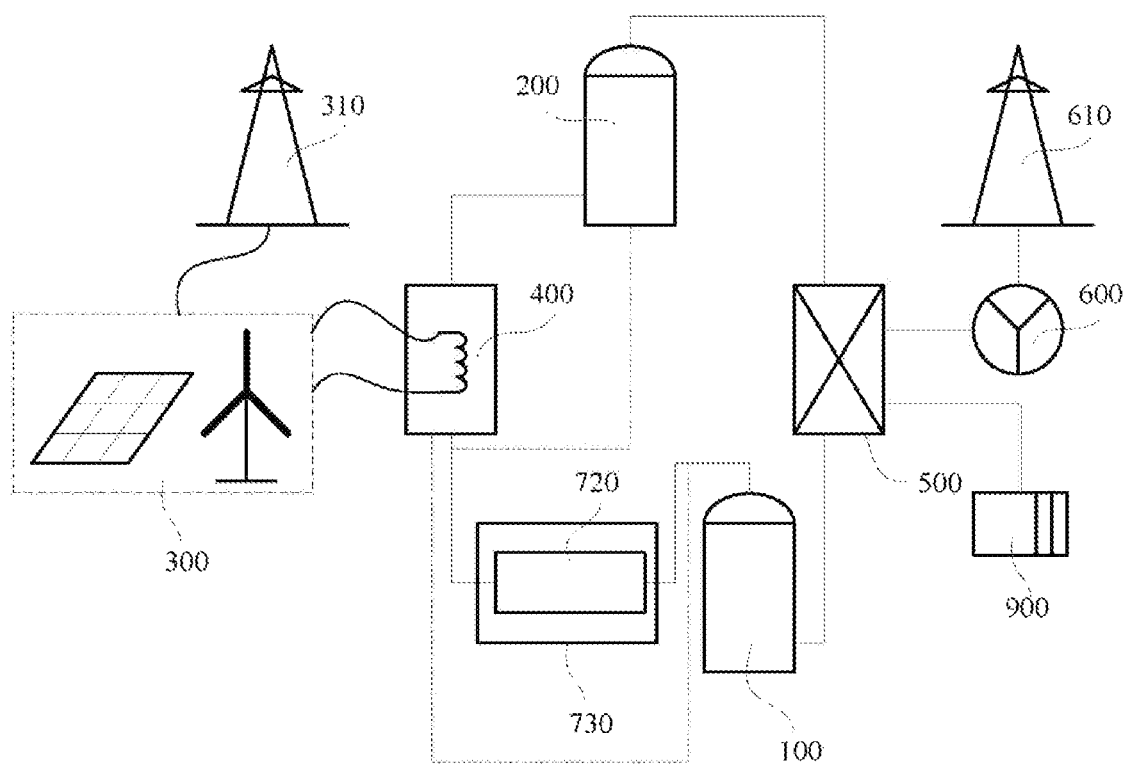
FIG. 13 is a schematic view of the energy supply system of wind, photovoltaic, solar thermal power and molten salt-based heat storage according to another embodiment.

FIG. 13 is a schematic view of the energy supply system of wind, photovoltaic, solar thermal power and molten salt-based heat storage according to another embodiment.

Different from the first embodiment, the second heater configured to heat the low-temperature molten salt outputted by the low-temperature molten salt tank 100 in the embodiment is a trough solar heat collector equipment 720; the low-temperature molten salt is single-channel heated into high-temperature molten salt. Specifically, the trough solar heat collector equipment 720 heats the low-temperature molten salt, then transmits the heated molten salt into the molten salt electric heater 400 for reheating, such that the following molten salt electric heater 400 can heat the molten salt to appropriate temperature faster, which utilizes the "abandoned wind" and "abandoned light" energy efficiently. Since the freezing point of heat transfer fluid is low, energy consumption of heat preservation of the system can be reduced efficiently, which may reduce upper operation cost.

The trough solar heat collector equipment 720 has two heating methods. One method is to utilize solar heat collection to heat the low-temperature molten salt directly, and the other method is to utilize the solar energy to heat the heat transfer fluid, and make the heated heat transfer fluid pass through the second heat exchanger 730 so as to heat the low-temperature molten salt. Since the maximum temperature of the heat transfer fluid can reach 390° C., the temperature of the heated molten salt cannot exceed 390° C. If superheated steam generated by direct heat exchange is more than 300° C., then the power generation efficiency of the steam generator set 600 is low. By utilizing the wind and photovoltaic power generation equipment 300 to reheat the molten salt to 550-600° C., supersaturated steam generated by the heat exchanger can reach more than 500° C., and the efficiency of the steam turbine generator set is high.

Figure 14:
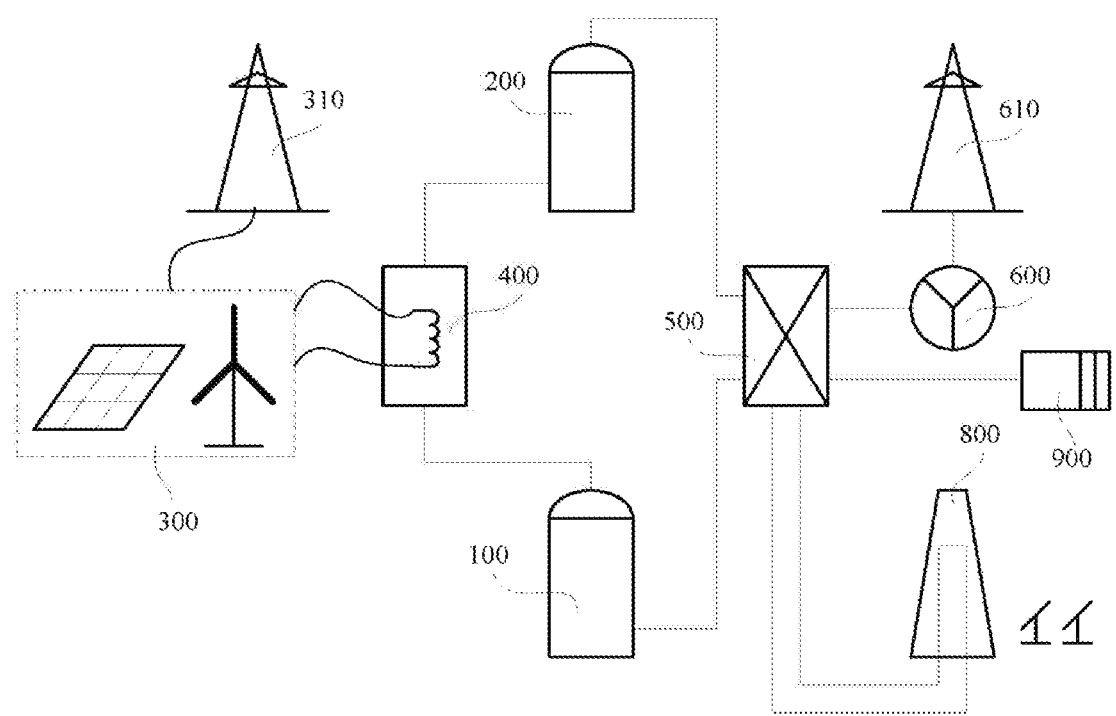
FIG. 14 is a schematic view of the energy supply system of wind, photovoltaic, solar thermal power and molten salt-based heat storage according to a further another embodiment.

FIG. 14 is a schematic view of the energy supply system of wind, photovoltaic, solar thermal power and molten salt-based heat storage according to a further another embodiment.

Different from the first embodiment, this embodiment omits the second heater (the first tower solar heat collector equipment 700), and adds a third heater which heats water in the heat exchanger 500. The third heater includes the second tower solar heat collector equipment 800 which heats the superheated steam generator to generate the superheated steam which drives the steam turbine to generate power. The second tower solar heat collector equipment 800 can heat the water heated or not heated by the preheater into the second steam which is then reheated by the superheated steam generator to generate the superheated steam which drives the steam turbine to generate power and utilize the "abandoned wind" and "abandoned light" efficiently. Because the temperature of the steam generated directly by the second tower solar heat collector equipment 800 is about 400° C., efficiency of direct power generation is not high and only when the sun appears can the power be generated. Therefore, when there is sunlight, the second steam generated directly by the second tower solar heat collector equipment 800 will be reheated by the superheated steam generator in the heat exchanger 500 into higher than 500° C., and then generate power. When there is no light, the second tower solar heat collector equipment 800 will be closed and stop working. The molten salt electric heater 400 heats the molten salt, and the stored energy and the heat exchanger will generate superheated steam which is configured to generate power, supply heating and cooling.

Figure 15:
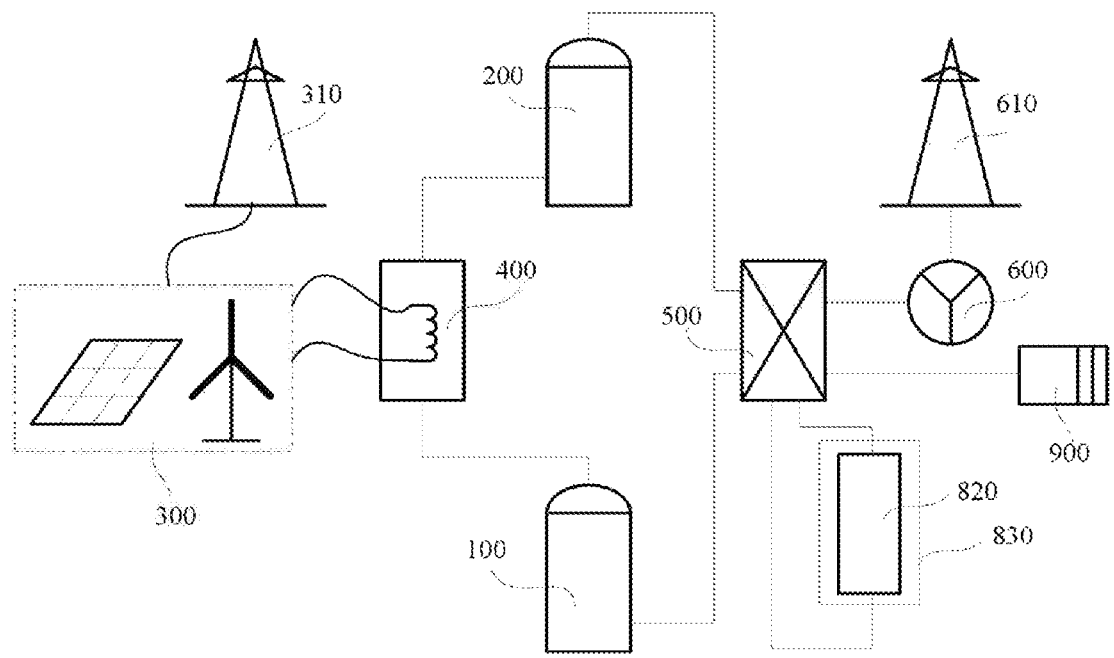
FIG. 15 is an alternative of the energy supply system of wind, photovoltaic, solar thermal power and molten salt-based heat storage in FIG. 14.

FIG. 15 is an alternative of the energy supply system of wind, photovoltaic, solar thermal power and molten salt-based heat storage in FIG. 14.

Different from the embodiment relevant to FIG. 4, the second tower solar heat collector equipment 800 is replaced by the second trough solar heat collector equipment 820. The second trough solar heat collector equipment 820 has two heating methods. One method is to utilized solar heat collection to heat the water directly; the other method is to utilize the solar energy to heat the heat transfer fluid, and make the heated heat transfer fluid pass through the third heat exchanger 830 so as to heat the water.

In other embodiments, the second heater (such as the first tower solar heat collector equipment 700 or trough solar heat collector equipment) and the third heater (such as the second tower solar heat collector equipment 800) can work together to utilize the "abandoned wind" and "abandoned light" efficiently, which better avoids energy waste and improves power generation. The demand for solar thermal heat collection field can be reduced efficiently; the investment to the heat collection field is reduced, and construction cost is reduced efficiently.

The combined energy supply system of wind, photovoltaic, solar thermal power and molten salt-based heat storage is capable of storing the energy which would have been "abandoned wind" and "abandoned light" temporarily in the form of heat by molten salt-based energy storage. By utilizing the molten salt to store the energy, the electrothermal efficiency can be more than 90%; energy utilization ratio is high and the energy is saved properly. During power grid peak, the energy will release heat and generate power, which functions as peak shaving in power grid and avoids energy waste properly. Utilizing the molten salt to store energy may convert unstable wind and photovoltaic power into stable thermal energy and export when a considerable fluctuation happens to the wind and photovoltaic power generation, which guarantees stable supply of energy and reduce impact on the power grid. Utilizing the second heater to heat the unheated molten salt outputted by the low-temperature molten salt tank or utilizing the third heater to heat the water in the heat exchanger may improve stored energy of the molten salt and heating efficiency of the heat exchanger, thereby improving power generation.

In the combined energy supply system of wind, photovoltaic, solar thermal power and molten salt-based heat storage, the wind and photovoltaic power generation equipment can not only utilize all the power generated by wind and photovoltaic to heat the molten salt and then generate power, but also generate power, at the same time, utilize the remaining power to heating the molten salt (unheated molten salt). When the remaining energy is not much while the demand is high (for example, during summer daytime, the power demand is so high that the remaining energy is not much or even insufficient), then the power generated by the molten salt is insufficient. Then, the second heater may be utilized to heat the low-temperature molten salt outputted by the low-temperature molten salt tank, or a third heater may be utilized to heat the water in the heat exchanger so as to improve stored energy of the molten salt and heating efficiency of the heat exchanger, thereby improving power generation. Therefore, the steam generator set may generate power instantly or release heat to generate power until power grid peaks, such that the peak shaving in power grid is further improved. Surely, when there is sunlight during daytime, the second heater or the third heat can work and does not have to wait until the remaining energy is insufficient while the demand is high, then the energy can be stored in energy-shortage area so as to supply power in real time.

The above embodiments are only several embodiments of the present invention, descriptions thereof are relatively specific and detailed, however, these should not be deemed as being intended to limit the present invention. It should be noted that those skilled in the art may make any replacements and modifications made within the spirit of the present invention, which are all contained within the protection scope of the invention. Therefore, the protection scope of the invention should be subjected to the attached claims.

What is claimed is:

1. A combined energy supply system of wind, photovoltaic, solar thermal power and medium-based heat storage, comprising:
   a first medium tank configured to store unheated medium;
   a second medium tank configured to store heated medium;
   a wind and photovoltaic power generation equipment configured for power generation;
   a first heater configured to heat the medium from the first medium tank into the heated medium using power generated by the wind and photovoltaic power generation equipment;
   a heat exchanger configured to heat water to steam using the heated medium outputted by the second medium tank;
   a steam generator set configured to make the steam drive a steam turbine to generate power;
   wherein the unheated medium is output from the first medium tank, and heated by the first heater to be converted into the heated medium which is stored in the second medium tank; the heated medium is then output from the second medium tank into the heat exchanger, and the steam generated by the heat exchanger drives the steam generator set to generate power;

further comprising: a second heater configured to heat the unheated medium output by the first medium tank;

wherein the first heater is arranged downstream of an outlet of the first medium tank and upstream of an outlet of the second medium tank and the heat exchanger is arranged downstream of the second medium tank;

wherein the second heater is arranged between the first heater and the first medium tank such that the unheated medium output from the first medium tank is firstly heated by the second heater to a first temperature and then heated by the first heater from the first temperature to a second temperature higher than the first temperature; and wherein a first pipeline route is arranged to directly connect the first medium tank with the first heater powered by the wind and photovoltaic power generation equipment, and a second pipeline route is arranged to directly connect the second heater with the second medium tank;

wherein an output end of the first medium tank is directly respectively connected to the first heater and the second heater; and an output end of the second heater is directly respectively connected to the first heater and the second medium tank; such that the heated medium directly outputted into the second medium tank without passing through the first heater when energy supplied by the second heater is sufficient; and temperature sensors are disposed at the pipeline route between the first heater, the second heater and the second medium tank.

2. The combined energy supply system of wind, photovoltaic, solar thermal power and medium-based heat storage of claim 1, wherein the second heater comprises a first tower solar heat collector equipment through which solar heat collection is utilized to heat the unheated medium output from the first medium tank directly.

3. The combined energy supply system of wind, photovoltaic, solar thermal power and medium-based heat storage of claim 1, further comprising a third heater configured to heat the water or steam in the heat exchanger wherein the third heater comprises a second tower solar heat collector equipment or a second trough solar heat collector equipment.

4. The combined energy supply system of wind, photovoltaic, solar thermal power and medium-based heat storage of claim 1, further comprising a heating equipment or a refrigeration equipment; wherein the heating equipment or the refrigeration equipment is connected to the heat exchanger.

5. The combined energy supply system of wind, photovoltaic, solar thermal power and medium-based heat storage of claim 1, wherein the heat exchanger comprises a superheated steam generator that generates superheated steam, a steam generator that generates saturated steam and a preheater that heats the water; the heated medium outputted by the second medium tank heats the superheated steam generator, the steam generator and the preheater in sequence; the superheated steam generator is connected to the steam generator set, and the superheated steam generated by the superheated steam generator drives the steam turbine to generate power.

6. The combined energy supply system of wind, photovoltaic, solar thermal power and medium-based heat storage of claim 5, further comprising a third heater configured to heat the water or steam in the heat exchanger wherein the third heater heats the superheated steam generator to generate the superheated steam which drives the steam turbine to generate power.

7. The combined energy supply system of wind, photovoltaic, solar thermal power and medium-based heat storage of claim 1, further comprising a water treatment equipment connected to the steam generator set and the heat exchanger; wherein the water treatment equipment treats the water liquefied by the steam after passing through the steam generator set, the treatment comprises at least one of nitrogen-removal, desalting and cooling treatment, and the treated water is delivered back into the heat exchanger.

8. The combined energy supply system of wind, photovoltaic, solar thermal power and medium-based heat storage of claim 1, further comprising a first medium pump configured to provide mobilization dynamic for the unheated medium and a second medium pump configured to provide mobilization dynamic for the heated medium.

9. The combined energy supply system of wind, photovoltaic, solar thermal power and medium-based heat storage of claim 1, wherein at least one of a temperature sensor, a flow sensor, a pressure sensor and a speed sensor is/are further arranged among the equipment according to requirements.

10. The combined energy supply system of wind, photovoltaic, solar thermal power and medium-based heat storage of claim 1, wherein the heated medium stored in the second medium tank comes from both the first heater and the second heater.

11. The combined energy supply system of wind, photovoltaic, solar thermal power and medium-based heat storage of claim 1, wherein the first heater and the second heater are in series connected between the first medium tank and the second medium tank.

12. The combined energy supply system of wind, photovoltaic, solar thermal power and medium-based heat storage of claim 1, wherein the second heater comprises a trough solar heat collector equipment which comprises a heat exchanger, solar energy collected by the second heater is utilized to heat a heat transfer fluid with a maximum temperature not exceed the first temperature, the heated heat transfer fluid is provided to the second heater so as to heat the unheated medium, and the first heater heats the heated medium output from the second heater to the second temperature higher than the first temperature.

13. The combined energy supply system of wind, photovoltaic, solar thermal power and medium-based heat storage of claim 1, wherein the first heater is an electric heating tape twined around the second medium tank.

14. The combined energy supply system of wind, photovoltaic, solar thermal power and medium-based heat storage of claim 1, wherein the second heater is configured to be in operation when remaining energy of the wind and photovoltaic power generation equipment is not much while the demand is high.

* * * * *